(12) United States Patent
Gerasimov

(10) Patent No.: US 8,031,429 B2
(45) Date of Patent: Oct. 4, 2011

(54) MULTI-DIRECTIONAL SELF SERVO-WRITING FOR A DISK DRIVE

(75) Inventor: Anton Gerasimov, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 1222 days.

(21) Appl. No.: 11/731,530

(22) Filed: Mar. 30, 2007

(65) Prior Publication Data

US 2008/0239557 A1  Oct. 2, 2008

(51) Int. Cl.
*G11B 5/596* (2006.01)

(52) U.S. Cl. .................. 360/78.09; 360/75; 360/78.08; 360/78.04

(58) Field of Classification Search .................. None
See application file for complete search history.

(56) References Cited

U.S. PATENT DOCUMENTS

| | | | | |
|---|---|---|---|---|
| 5,262,907 | A * | 11/1993 | Duffy et al. | 360/77.05 |
| 5,973,875 | A * | 10/1999 | Hughes et al. | 360/77.13 |
| 6,994,029 | B2 * | 2/2006 | Hashi et al. | 101/489 |
| 7,268,963 | B2 * | 9/2007 | Chainer et al. | 360/51 |
| 7,405,893 | B2 * | 7/2008 | Bi et al. | 360/48 |
| 2003/0197968 | A1 | 10/2003 | Sacks et al. | |
| 2005/0219734 | A1* | 10/2005 | Rothermel et al. | 360/75 |
| 2006/0139788 | A1* | 6/2006 | Yang et al. | 360/75 |

FOREIGN PATENT DOCUMENTS

| | | |
|---|---|---|
| CN | 1571016 A | 1/2005 |
| JP | 606036 | 2/1985 |
| JP | 6052511 | 2/1994 |
| JP | 3784567 | 6/2006 |
| JP | 2000268516 | 9/2006 |

OTHER PUBLICATIONS

"Chinese Application Serial No. 200810086077, Office Action mailed Nov. 20, 2009", 11 pgs.
Lairson, Bruce M, et al., "Disk Drive Integration Issues for Perpendicular Recording", *IEEE Transactions on Magnetics* vol. 37, No. 4, (Jul. 2001), 1223-1227.

* cited by examiner

*Primary Examiner* — Joseph Feild
*Assistant Examiner* — Huy Nguyen
(74) *Attorney, Agent, or Firm* — Schwegman, Lundberg & Woessner, P.A.

(57) ABSTRACT

A method of self servo-writing servo information to a plurality of disk surfaces in a disk drive that includes writing servo information to a plurality of disk surfaces in a first direction, writing servo information to a plurality of disk surfaces in a second direction, and determining an amount of overlap to be written on a reference surface with the reference head that will produce an overlap of servo information on each of the surfaces in the disk drive to which servo information is to be written. The method also includes switching to different tables when seeking across the overlap or border areas.

9 Claims, 8 Drawing Sheets

MULTI-DIRECTIONAL SELF SERVO-WRITING FOR A DISK DRIVE

TECHNICAL FIELD

Various embodiments described herein relate to apparatus, systems, and methods associated with information storage and processing. More specifically, the apparatus, systems and methods relate to multi-directional self servo-writing to a disk or set of disks in a disk drive.

BACKGROUND

A disk drive is an information storage device. A disk drive includes one or more disks clamped to a rotating spindle, and at least one head for reading information representing data from and/or writing data to the surfaces of each disk. Disk drives also include an actuator utilizing linear or rotary motion for positioning transducing head(s) over selected data tracks on the disk(s). A rotary actuator couples a slider, on which a transducing head is attached or integrally formed, to a pivot point that allows the transducing head to sweep across a surface of a rotating disk. The rotary actuator is driven by a voice coil motor. Storing data includes writing information representing data to portions of tracks on a disk. Data retrieval includes reading the information representing data from the portion of the track on which the information representing data was stored.

Disk drive information storage devices employ a control system for controlling the position the transducing head during read operations, write operations and seeks. The control system includes a servo control system or servo loop. The function of the head positioning servo control system within the disk drive information storage device is two-fold: first, to position the read/write transducing head over a data track with sufficient accuracy to enable reading and writing of that track without error; and, second, to position the write element with sufficient accuracy not to encroach upon adjacent tracks to prevent data erosion from those tracks during writing operations to the track being followed.

A servo control system includes a written pattern on the surface of a disk called a servo pattern. The servo pattern is read by the transducing head. Reading the servo pattern results in positioning data or a servo signal used to determine the position of the transducing head with respect to a track on the disk. In one servo scheme, positioning data can be included in servo wedges, each including servo patterns.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

Figure 1:
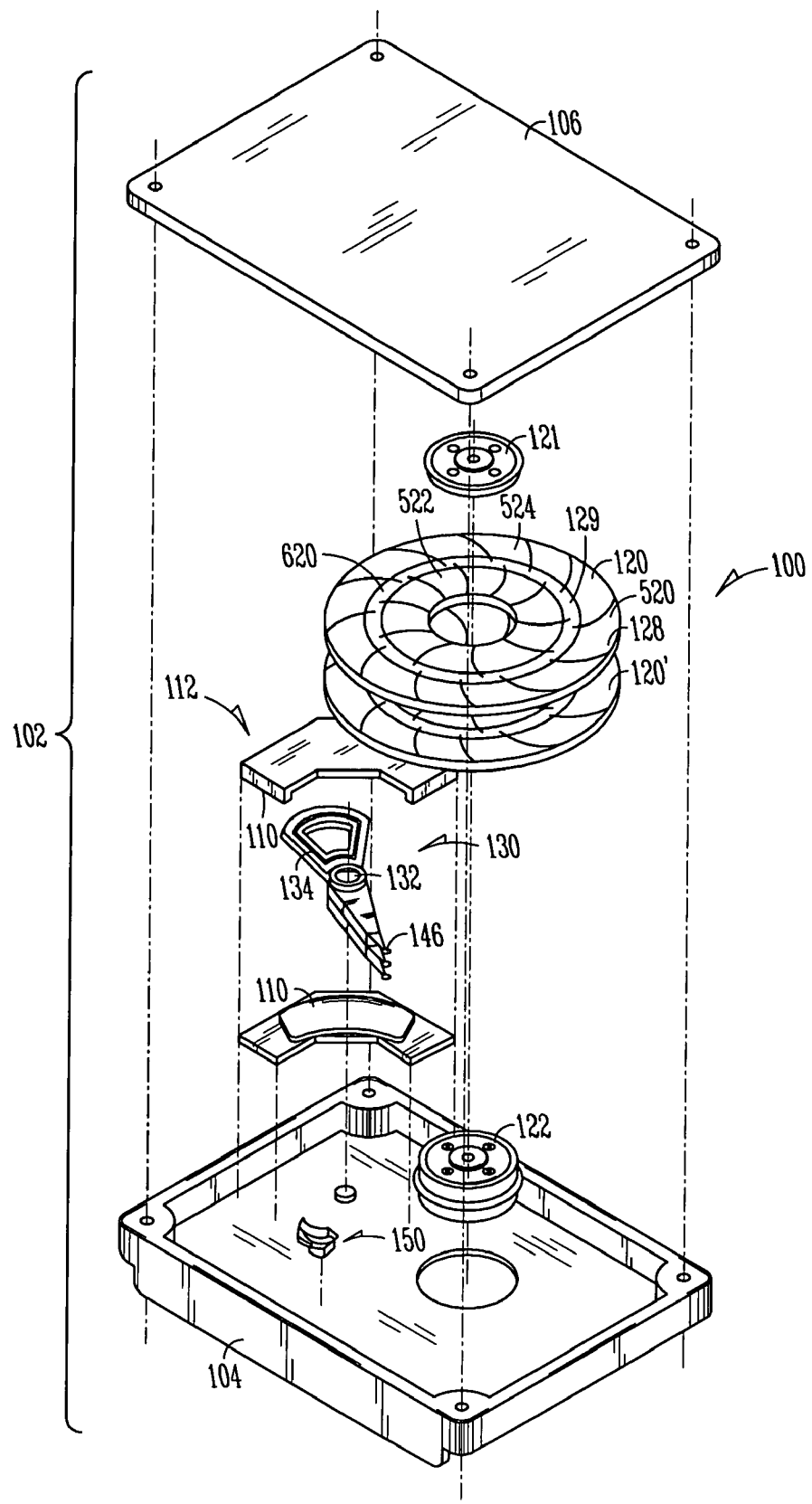
FIG. 1 is an exploded view of a disk drive, according to an example embodiment described herein.

FIG. 1 is an exploded view of disk drive 100 that uses various embodiments of the present invention. The disk drive 100 includes a housing 102 including a housing base 104 and a housing cover 106. The housing base 104 illustrated is a base casting, but in other embodiments a housing base 104 can comprise separate components assembled prior to, or during assembly of the disk drive 100. A disk 120 is attached to a hub or spindle 122 that is rotated by a spindle motor. The disk 120 can be attached to the hub or spindle 122 by a clamp 121. The disk may be rotated at a constant or varying rate ranging from less than 3,600 to more than 15,000 revolutions per minute. Higher rotational speeds are contemplated in the future. The spindle motor is connected with the housing base 104. The disk 120 can be made of a light aluminum alloy, ceramic/glass or other suitable substrate, with magnetizable material deposited on one or both sides of the disk. The magnetic layer includes small domains of magnetization for storing data transferred through a transducing head 146. The transducing head 146 includes a magnetic transducer adapted to read data from and write data to the disk 120. In other embodiments, the transducing head 146 includes a separate read element and write element. For example, the separate read element can be a magneto-resistive head, also known as a MR head. It will be understood that multiple head 146 configurations can be used.

A rotary actuator 130 is pivotally mounted to the housing base 104 by a bearing 132 and sweeps an arc between an inner diameter (ID) of the disk 120 and a ramp 150 positioned near an outer diameter (OD) of the disk 120. Attached to the housing 104 are upper and lower magnet return plates 110 and at least one magnet that together form the stationary portion of a voice coil motor (VCM) 112. A voice coil 134 is mounted to the rotary actuator 130 and positioned in an air gap of the VCM 112. The rotary actuator 130 pivots about the bearing 132 when current is passed through the voice coil 134 and pivots in an opposite direction when the current is reversed, allowing for control of the position of the actuator 130 and the attached transducing head 146 with respect to the disk 120. The VCM 112 is coupled with a servo system (shown in FIG. 4) that uses positioning data read by the transducing head 146 from the disk 120 to determine the position of the transducing head 146 over one of a plurality of tracks on the disk 120. The servo system determines an appropriate current to drive through the voice coil 134, and drives the current through the voice coil 134 using a current driver and associated circuitry (shown in FIGS. 4 and 5). It should be noted that in some transducing head includes two separate elements. One element is for reading information representing data and reading positional information or servo information. This element is known as a read element. The other element, in these embodiments, is for writing information representing data and is known as a write element. One example of such a transducing head is a magnetoresistive (MR) transducing head.

Each side of a disk 120 can have an associated head 146, and the heads 146 are collectively coupled to the rotary actuator 130 such that the heads 146 pivot in unison. Typically the rotary actuator 130 and all of the heads 146 attached thereto are referred to as a head stack 500 (shown schematically in FIG. 5). The invention described herein is equally applicable to devices wherein the individual heads separately move some small distance relative to the actuator. This technology is referred to as dual-stage actuation (DSA).

One type of servo system is an embedded, servo system in which tracks on each disk surface used to store information representing data contain small segments of servo information. The servo information, in this embodiment, is written in two sections. Each disk in a disk drive, 120, 120' includes two surfaces on which information may be stored. One of these surfaces 520 of the disks 120, 120' is shown in FIG. 1. The disk surface 520 includes a inner diameter, an outer diameter, and an overlap area 620. The disk surface 520 is considered to be divided into an inner zone 522 (from the inner diameter to the overlap area 620), and an outer zone 526 (from the inner diameter to the overlap area 620). The servo information, in some embodiments, is stored in radial servo sectors or servo wedges shown as several narrow, somewhat curved spokes. One set of spokes is positioned in the inner zone 522 and another set of spokes is positioned in the outer zone 526. The overlap area 620 divides the inner zone 522 and the outer zone 524. The spokes of servo wedges may not necessarily be continuous across the surface 520 of the disk 120 The spokes on the outer diameter are represented by one spoke 128 substantially equally spaced around the outer zone of the disk 120. The spokes on the inner diameter are represented by one spoke 127 substantially equally spaced around the inner zone of the disk 120. It should be noted that in actuality there may be many more servo wedges than as shown in FIG. 1. The content of the servo wedge 128 is further detailed in FIG. 3 and in the discussions related to FIG. 3.

The disk 120 also includes a plurality of tracks on each disk surface. The plurality of tracks is depicted by three tracks, such as track 129, on the surface 520 of the disk 120. The servo wedges 128 traverse the plurality of tracks, such as track 129, on the disk 120. The plurality of tracks, in some embodiments, may be arranged as a set of substantially concentric circles. Data is stored in fixed sectors along a track between the embedded servo wedges 127, 128. The tracks on the disk 120 each include a plurality of data sectors. More specifically, a data sector is a portion of a track having a fixed block length and a fixed data storage capacity (e.g., 512 bytes of user data per data sector). The tracks toward the inside of the disk 120 are not as long as the tracks toward the periphery of the disk 110. As a result, the tracks toward the inside of the disk 120 can not hold as many data sectors as the tracks toward the periphery of the disk 120. Tracks that are capable of holding the same number of data sectors are grouped into a data zones. Since the density and data rates vary from data zone to data zone, the servo wedges 128 may interrupt and split up at least some of the data sectors. The servo sectors 128 are typically recorded with a servo writing apparatus at the factory (called a servo-writer), but may be written (or partially written) with the disk drive's 100 transducing head 146 in a self-servowriting operation.

Figure 2:
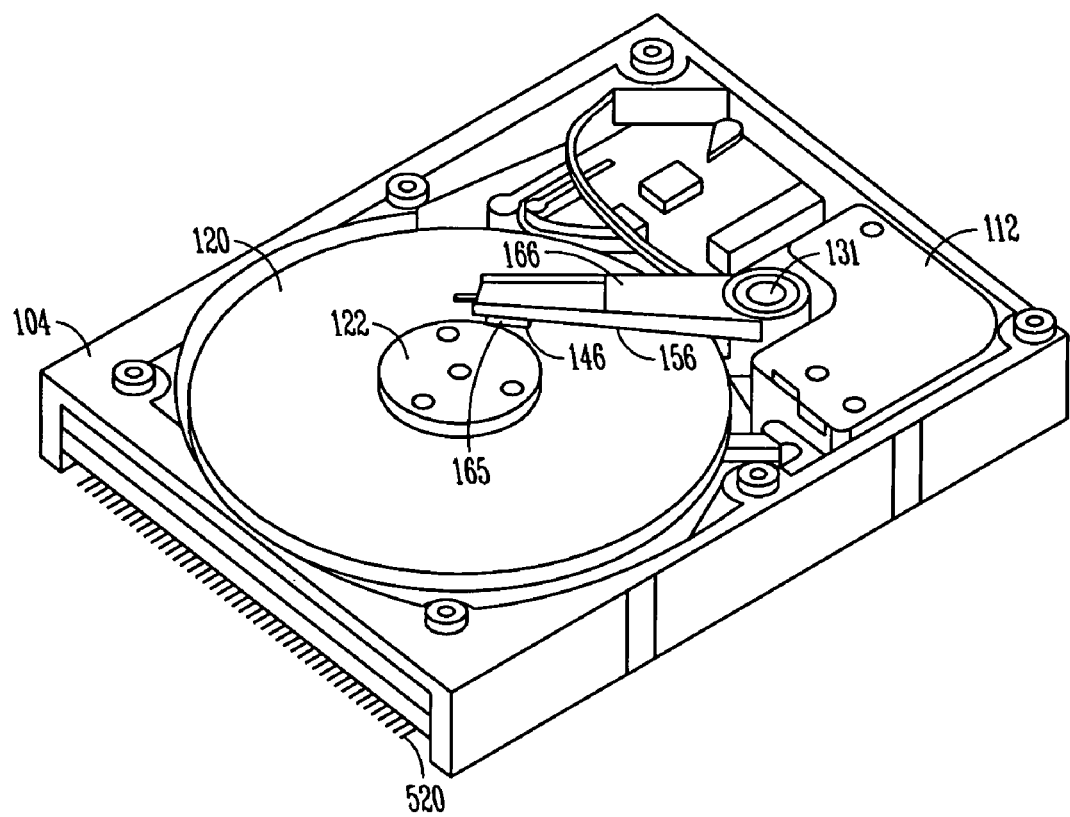
FIG. 2 is an view of a disk drive with a cover removed, according to an example embodiment described herein.

FIG. 2 is a perspective view of a substantially assembled disk drive, according to an example embodiment described herein. The housing cover 106 is removed for the sake illustration. In some embodiments, the disk drive 100 is a magnetic recording and reproducing apparatus (hard disk drive). The disk drive housing base 104 serves as a chassis. Mounted to the chassis or housing base 104 is a magnetic disk 120, a transducing head 146 including a read head and a write head. The transducing head 146 includes a slider 156. The read head and the write head are formed in and at one end of the slider 156, respectively. The slider 156 is attached to the actuator by a head suspension assembly 166. The head suspension assembly 166 includes a suspension 165 and an actuator arm 164 that supports the head slider 156 in transducing relation with the surface of the disk 120. Also attached to the housing base 104 or the chassis is a printed circuit board (PCB) 5200.

The magnetic disk 120 is a discrete track media. The magnetic disk 120 is mounted on a spindle 122 that is rotated by a spindle motor which typically is mounted within the hub or the spindle 122. Various digital data are recorded on the magnetic disk 120. In some embodiments, the data is recorded with magnetic transitions parallel to the major surface of the disk 120 while in other embodiments, the magnetic transitions are perpendicular to the major surface of the disk 120. In some embodiments, the magnetic head incorporated in the head slider 156 is a so-called integrated head including a write head of a single pole structure and a read head using a shielded MR read element (such as a GMR film or a TMR film). The voice coil motor (VCM) 112 drives the head suspension assembly about a pivot point 131 to position the magnetic head 156 at a radial position of the magnetic disk 120. The circuit board 108 comprises a head IC to generate driving signals for the voice coil motor (VCM) 112 and control signals for controlling read and write operations performed by the magnetic head 156.

Figure 3:
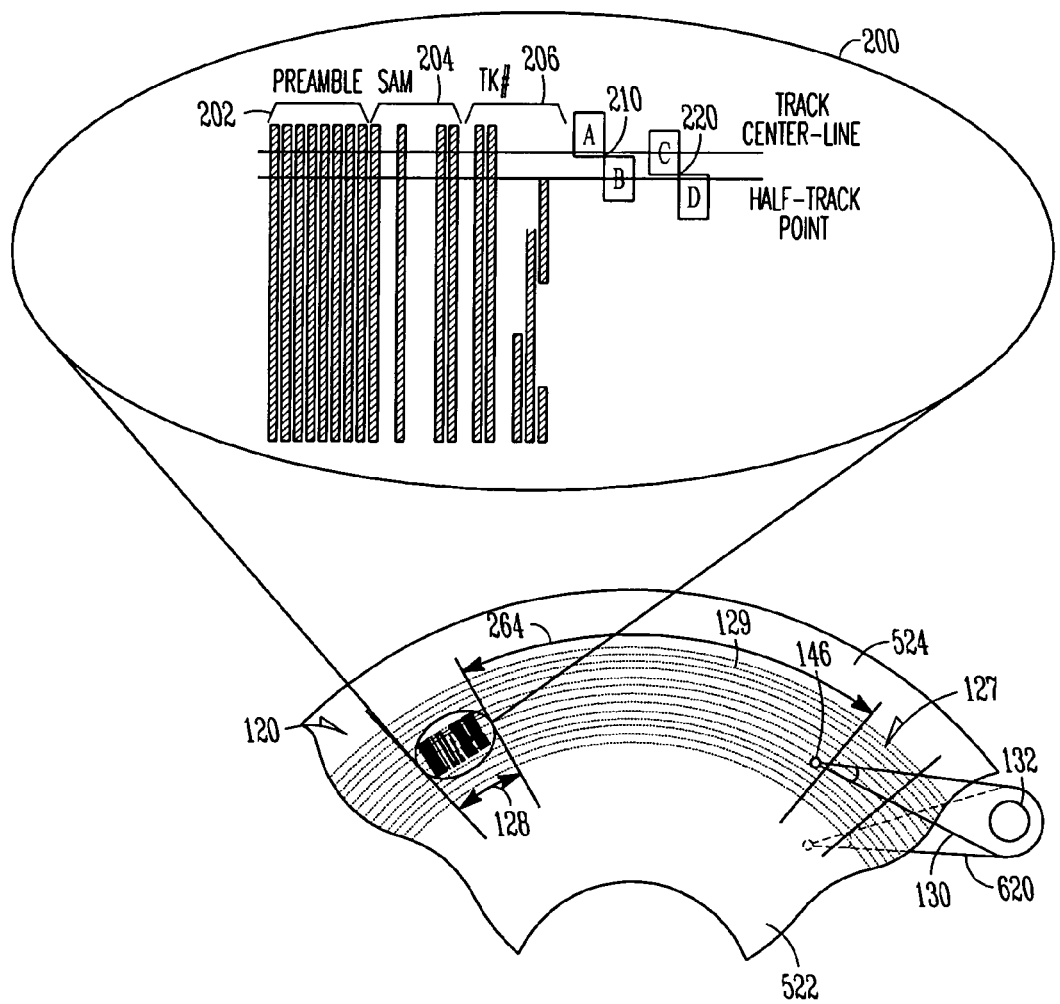
FIG. 3 shows a portion of a disk and a first servo wedge and a second servo wedge, according to an example embodiment.

FIG. 3 shows a portion of a disk 120 and at least one servo wedge 128, according to an example embodiment. FIG. 3 discusses further details related to the servo wedge 128 and shows a plurality of tracks on the surface of the disk 120. Each servo wedge 128 includes information stored as regions of magnetization. The servo wedge 128 can be longitudinally magnetized (for example, in the magnified portion of FIG. 3 a servo pattern 200 includes cross-hatched blocks magnetized to the left and white spaces magnetized to the right, or vice-versa) or alternatively perpendicularly magnetized (e.g., the cross-hatched blocks are magnetized up and the white spaces are magnetized down, or vice-versa). Servo patterns 200 contained in each servo wedge 128 are read by the transducing head 146 as the surface of the spinning disk 120 passes under the transducing head 146. The servo patterns 200 can include information identifying a data sector contained in a data field 264. For example, the servo pattern 200 can include digital information such as a preamble 202, a servo address mark (SAM) 204, a track identification number 206. The servo pattern 200 also includes a set of servo bursts. As shown in FIG. 3, the set of servo bursts include an A servo burst, a B servo burst, a C servo burst, and a D servo burst. There is a servo burst edge 210 between the A burst and the B burst, and a servo burst edge 220 between the C burst and the D burst. The pattern shown is a quadrature type pattern. In some embodiments, a disk drive will include a single column of each type of servo burst in each servo wedge 128. Each column corresponds to a radial of the disk. As shown in this embodiment, there are two columns of A, B, C, and D bursts which may be used in some embodiments. In some embodiments, the servo wedge 128 will also include other information such as a wedge number. This can be a single bit to designate an index wedge (wedge #0), or the SAM may be replaced by another pattern (referred to as a servo index mark or SIM), or the wedge may contain a few low-order bits of the wedge number or a complete wedge number. There are many different patterns for servo bursts, such as a null pattern.

This pattern shows four servo bursts and it should be understood that this may also be repeated in columns so as to produce several radial lines of AB and CD bursts on the disk in each servo wedge, such as servo wedge 128, on the disk. The servo burst pattern results in a servo burst edge 210 between the A and B servo bursts, and a servo burst edge 220 between the C and D servo bursts in the null pattern. In some embodiments, the disk 120 may be other than a magnetic disk. In such cases, the servo wedge 128 can include other indicia, such as optical indicia.

Figure 4:
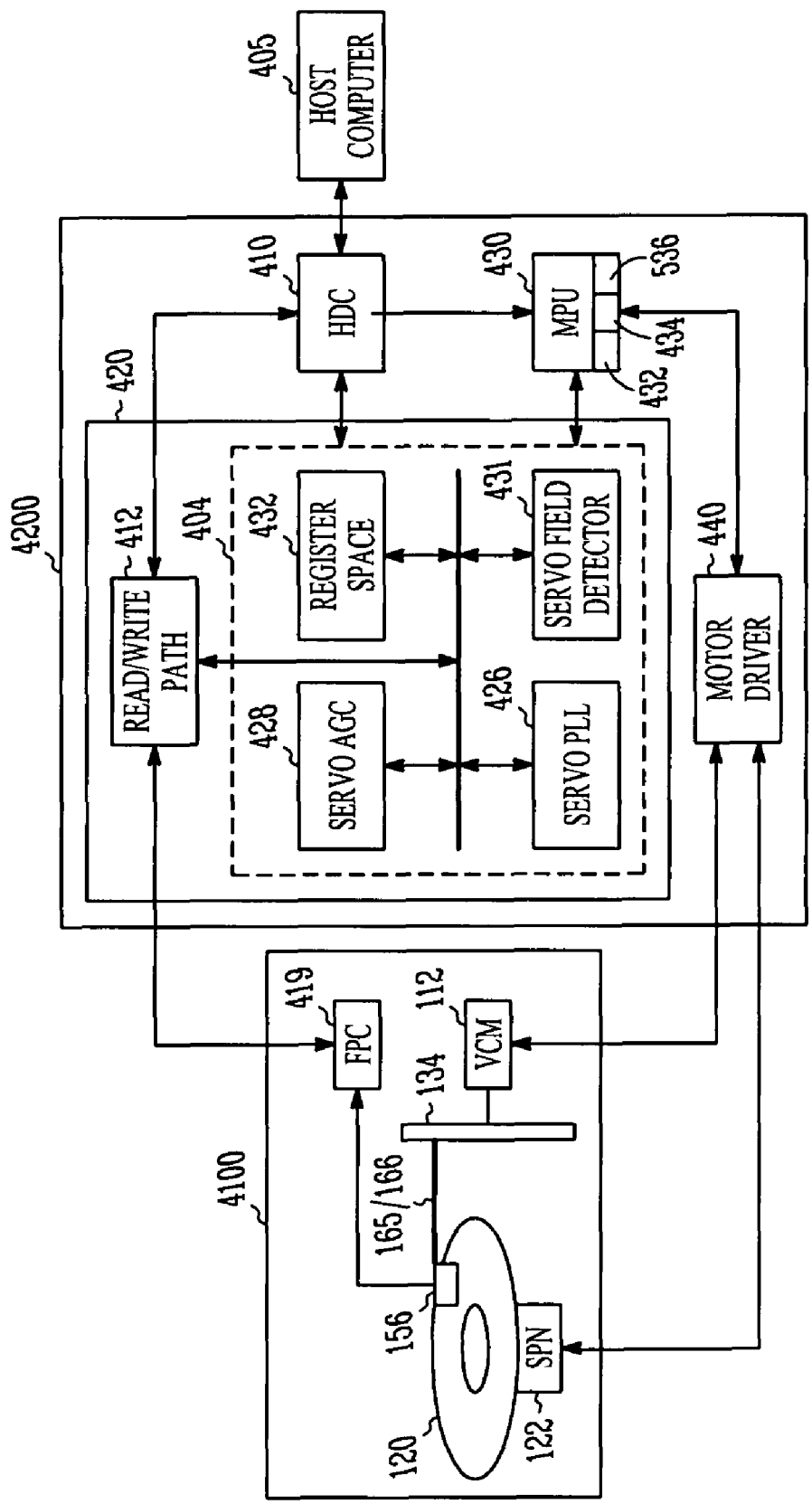
FIG. 4 shows a block diagram of the disk drive, according to an example embodiment.

FIG. 4 shows a block diagram of the disk drive 100, according to an example embodiment. As shown, the disk drive includes a main body unit called a head disk assembly (HDA) 4100 and a printed circuit board (PCB) 4200. Some details of the HDA 4100 have been discussed with respect to FIGS. 1 and 2. Therefore, the discussion of the HDA 4100 will refer to FIGS. 1, 2 and 4. The head disk assembly (HDA) 4100 includes at least one magnetic disk 120, the spindle motor 122 for rotating the spindle (shown in FIGS. 1 and 2) and the magnetic disk 120. The HDA 4100 also includes a head slider 156, including the read head and the write head, a suspension 165 and an actuator arm 166, the voice coil motor (VCM) 112, and a head amplifier (HIC), which is not shown. The head slider 156 is provided with the read head such as a giant magnetoresistive (GMR) element and a write head, such as a thin film head formed on an end of the slider 156.

The head slider 156 may be attached to the suspension 165 a gimbal. The suspension 165 is attached to the actuator arm 166, which is rotatably attached to the pivot 131 (shown in FIG. 2). This figure shows the head slider 156 only above the top surface of the magnetic disk 120. It should be noted that generally a head slider is provided above the bottom and top surfaces of the magnetic disk 120, respectively. The voice coil motor (VCM) 112 generates a torque around the pivot 131 for the actuator arm 166 to rotate the head slider 156 over the surface of the disk 120. The head amplifier (HIC) is fixed to the actuator arm 166 to amplify input signals to and output signals from the write and read elements, respectively. The head amplifier (HIC) is connected to the printed circuit board (PCB) 4200 via a flexible print cable (FPC) 419. Placing the head amplifier (HIC) on the actuator arm 166 shortens the distance between the read head and the head amplifier and may effectively reduce noise in the head signals. However, in some embodiments, the head amplifier (HIC) may be fixed to the HDA main body, such as to the chassis or housing base 104.

The printed circuit board 4200 is attached to the exterior of the chassis or housing base 104. The printed circuit board (PCB) 4200 includes four major electronic components, so-called system LSIs. The LSIs are mounted on the printed circuit board (PCB) 4200. The system LSIs are a head disk controller (HDC) 410, a read/write channel IC 420, a microprocessor unit (MPU) 430, and a motor driver IC 440.

The MPU 430 is a control unit of a driving system and includes a read only memory (ROM) 432, random access memory (RAM) 434, a central processing unit (CPU) 436, and a logic processing unit which implement a head positioning control system, according to the present example embodiment. The logic processing unit is an arithmetic processing unit that includes a hardware circuit to execute high-speed calculations. Firmware (FW) for the logic processing circuit is saved to the ROM 432. Firmware includes a set of instructions executable by the MPU 430 to control portions of the disk drive.

The disk controller (HDC) 410 is an interface unit in the hard disk drive which manages the whole drive by exchanging information with interfaces between the disk drive and a host computer 400 (for example, a personal computer) and with the MPU 430, read/write channel IC 420, and motor driver IC 440.

The read/write channel IC 420 is a head signal processing unit relating to read/write operations. The read/write channel IC 420 is shown as including a read/write path 412 and a servo demodulator 404. The read/write path 412, which can be used to read and write user data and servo data, may include front end circuitry useful for servo demodulation. The read/write path 412 may also be used for writing servo information in self-servowriting. It should be noted that the disk drive also includes other components, which are not shown because they are not necessary to explain the example embodiments.

The servo demodulator 404 is shown as including a servo phase locked loop (PLL) 426, a servo automatic gain control (AGC) 428, a servo field detector 431 and register space 432. The servo PLL 426, in general, is a control loop that is used to provide frequency and phase control for the one or more timing or clock circuits (not shown in FIG. 4), within the servo demodulator 404. For example, the servo PLL 426 can provide timing signals to the read/write path 412. The servo AGC 428, which includes (or drives) a variable gain amplifier, is used to keep the output of the read/write path 412 at a substantially constant level when servo wedges 128 on one of the disks 120 (shown in FIGS. 1-4) are being read. The servo field detector 431 is used to detect and/or demodulate the various subfields of the servo wedges 128, including a servo address mark (SAM), a track number, a first phase servo burst, and a second phase servo burst. The MPU 430 is used to perform various servo demodulation functions (e.g., decisions, comparisons, characterization and the like), and can be thought of as being part of the servo demodulator 404. In the alternative, the servo demodulator 404 can have its own microprocessor.

One or more registers (e.g., in register space 432) can be used to store appropriate servo AGC values (e.g., gain values, filter coefficients, filter accumulation paths, etc.) for when the read/write path 412 is reading servo data, and one or more registers can be used to store appropriate values (e.g., gain values, filter coefficients, filter accumulation paths, etc.) for when the read/write path 412 is reading user data. A control signal can be used to select the appropriate registers according to the current mode of the read/write path 412. The servo AGC value(s) that are stored can be dynamically updated. For example, the stored servo AGC value(s) for use when the read/write path 412 is reading servo data can be updated each time an additional servo wedge 128 is read. In this manner, the servo AGC value(s) determined for a most recently read servo wedge 128 can be the starting servo AGC value(s) when the next servo wedge 128 is read.

The read/write path 412 includes the electronic circuits used in the process of writing and reading information to and from the magnetic disks 120. The MPU 430 can perform servo control algorithms, and thus, may be referred to as a servo controller. The MPU 430 can also control other functions of the disk drive.

Figure 5:
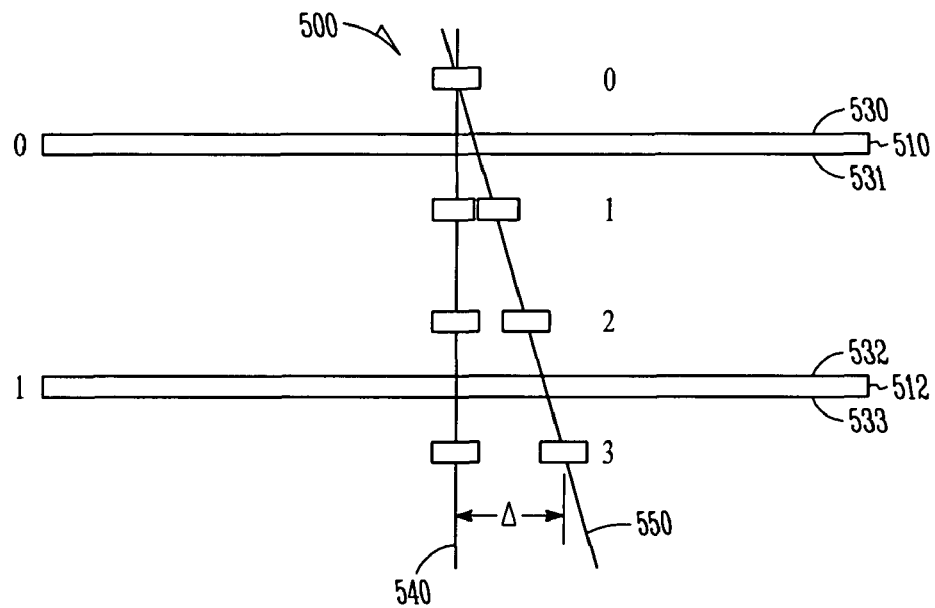
FIG. 5 shows a schematic diagram of a head stack for a disk drive, according to an example embodiment.

FIG. 5 shows a schematic diagram of a head stack 500 for a disk drive, according to an example embodiment. FIG. 5 is a schematic diagram of a head stack 500 engaged with first disk 510 and the second disk 512. The head stack 500 includes and actuator 130 (shown in FIG. 1). The head stack 500 also includes head 0, head 1, head 2, head 3. Head 0 is positioned for transducing upon a surface 530 of disk 510. Head 1 is in transducing relationship with the surface 531 of disk 510.

Head 2 is in transducing relationship with a surface 532 of disk 512 and head 3 is in transducing relationship with surface 533 of disk 512. As shown in FIG. 5, head 1, head 2, and head 3 are shown in two positions. It should be noted that a head stack could have any number of actuator arms and transducing heads. A disk drive can also include any number of disks, although two disks with 4 surfaces and 4 heads are shown here.

If the self servo write process is used to write servo pattern in a multi head drive a usual technique is to use bank-write. This technique allows to reduce the overall SSW time and make it essentially equal to the time necessary to servo-write one surface. In this case one of the drive heads (reference head), is used to obtain the position information for that head and for the entire head stack and several heads (non-reference heads) are used for writing of the servo pattern simultaneously. In this case the position of the reference head is determined most accurately since it is using the servo data written on the same surface for feedback position control. The actual position and dynamics of non-reference heads are affected by motion of the heads relative to each other-non-reference heads are functioning "open loop". The HDA dynamics such as arm motion and disk motion as well as head stack tilt could make the position of the non-reference heads significantly different that the reference head. With current high track density or tracks per inch (TPI) the DC component of this difference could reach several tracks. The written in position frequency components of could also be significantly different.

Head 0 always maintains the same (correct) position since it is used as a reference head. It should be noted that other heads (1, 2, or 3) could also be designated and used as the reference head. When a head is in the middle of the head stack 500, such as head 1 or 2, the worst offset associated with all the heads could be reduced. In a first position denoted by line 540 head 0, head 1, head 2, and head 3 are aligned along a line 540 which is substantially perpendicular to the surfaces 530, 531, 532, 533, of the disks 510, 512. FIG. 5 shows the worst possible (maximum) position difference due to a head tilt. As shown in FIG. 5, the head 1, head, 2, and head 3 are in the worst possible (maximum) tilt position along a line 550 in FIG. 5. The maximum relative position difference between any one of the heads in the head stack is denoted as A. As shown, the maximum positional difference of a head is shown in by head 3 on disk surface 533. While the A can be due to many different things including mechanical design parameters and characteristics or mechanical tolerances. In addition, the $\Delta$ could be due to vibrations that might occur in the head stack 500 during operation of the drive. The difference could either be calculated or may be empirically or experimentally determined based on the mechanical design parameters and characteristics.

Figure 6:
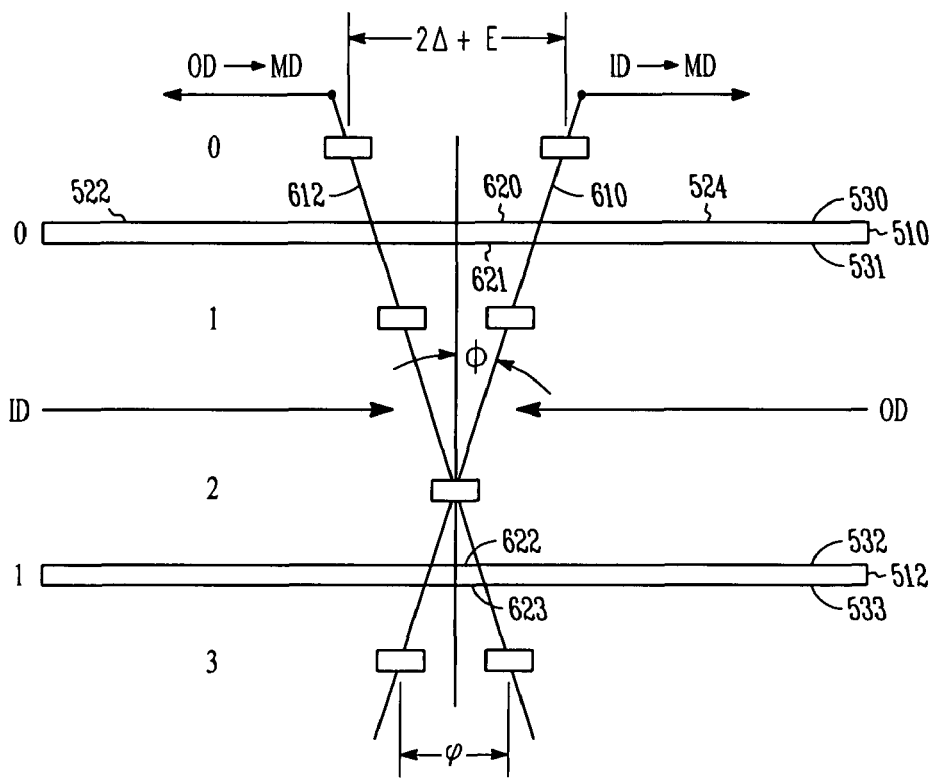
FIG. 6 is a schematic diagram of the overlap produced in writing a disk drive from first direction and from a second direction, according to an example embodiment.

FIG. 6 is a showing of the head stack 500 assembly and two final positions after writing an inner zone or first zone 522 and after writing an outer zone or second zone 524. The head stack 500 as shown in the position at the end of writing inner zone or first zone 522 as depicted by reference numeral 610. The head stack 500 is shown in the end position of writing the outer zone or second zone 524 as depicted by line 612. Line 610 passes through head 0, head 1, head 2, and head 3. Similarly line 612 passes through head 0, head 1, head 2, and head 3.

FIG. 6 shows the minimal amount of overlap that must be written at head 0 to provide overlap on surface 530, as well as disk surface 531 by head 1, and on disk surface 532 by head 2, and on disk surface 533 by head 3. The assumption is that the disk stack will tilt when writing in the direction of the inner diameter to an overlap area 620 to a position as depicted by reference numeral 610. Similarly, the head disk stack 500 will tilt to a different position when writing servo information from the outer diameter to the overlap area 620. The overlap must be at least 2 $\Delta$ plus $\epsilon$, where $\epsilon$ is the width of at least one track. The value $\Delta$ is the worst possible head stack 500 tilt as calculated or empirically determined. The value 2 $\Delta$ accommodates if the worst possible head stack tilt scenario, where maximum tilt occurs in both directions. The $\epsilon$ value of at least having one track assures that there will be a overlap of at least one track at any one of the overlap areas 620, 621, 622, 623.

As shown in FIG. 6, the overlap 620 is occurring on disk surface 530 on disk 510. There is also an overlap area 621 which is the distance between head 1 and the two positions on surface 531 of disk 510. In addition, there is an overlap area 622 on surface 532 of disk 512 and an overlap area 623 on surface 533 of disk 512. It should be noted that each of the overlap areas 620 on disk surface 530, overlap area 621 on disk surface 531, overlap area 622 on disk surface 532, or an overlap area 623 on disk 533 each have a slightly different width. The width is related to the tilt angle, which is denoted fee in FIG. 6. The width of overlap area 620 will be equal to approximately the value sine $\phi$ times the difference in height between head 0 and head 2. Similarly, sine $\phi$ times the difference or the distance between head 2 and head 1 will yield the width of the overlap area 621. The width of overlap area 622 will be sine $\phi$ times the height of head 2 with respect to the disk surface 532. The width of the overlap area 623 associated with disk surface 533 on disk 512 is equal to the distance between heads 2 and 3 times the sine $\phi$. Thus, it can be seen that the amount of overlap or the width of the overlap area is proportional to the distance between the various heads 0, 1, 2, 3.

It should also be noted that the amount of overlap when there is a head tilt or tilt angle in the head stack 500 will generally be different at each of the different disk surfaces 530, 531, 532, and 533. In other words, provided that there is some tilt angle with respect to the head stack assembly 500 the width of the overlap area 620, the overlap area 621, the overlap area 622 and the overlap 623 will all be different. Providing an overlap or at each and every disk surface 530, 531, 532, and 533 is very important. In order to determine the position on the disk surface there must be positional information or servo information provided on the disk. If there is an overlap area 620, 621, and 623 for each of the disk surfaces 530, 531, 532, and 533 then one can be assured that no matter where a particular head 0, 1, 2, 3 is flying or passing over a disk surface, there will always be positional data that can be used to determine the location of that particular head.

The overlapping area also serves as a boundary between the first or inner zone 522 and the second or outer zone 524. Since the tracks adjacent the boundary or overlap area 620, 621, 622, 623 are written at significantly different times, the servo information may have a different placement in both the radial and tangential directions. As a result, tangential or timing offsets could result in an incoherent servo signal on the boundary or on the overlapping area. This could lead to an inability to properly decode servo position information while the head is moving across the boundary area. The different direction of the servo writing for the first or inner zone 522 and the second or outer zone 524 could also result in different geometry of written transitions which could lead to different cross track servo automatic gain control (AGC) variations due to the preamble area transition differences, different position error signal demodulation gains, different cross track positioned error signal linearity.

As a result of all these differences between the first or inner zone 522 and the second and outer zone 524, the servo firmware executed by the MPU or a servo controller under direction of the MPU 430 has to handle the inner or first zone 522 and the outer or second zone 524 as separate zones. For example, repeat up all run out cancellation tables, position error signal gain tables, and position error signal linearization tables need to have separate entries for the tracks of the first or inner zone 522 and the tracks for the second or outer zone 524. The servo firm ware or MPU 430 that executes the software instructions need to detect the location of the boundary or overlap areas 620, 621, 622, and 623 for each of the respective disk surfaces 530, 531, 532, and 533. After the data heads have crossed the boundary or one of the overlap areas 620, 621, 622, 623 the various calibrated table values have to be reloaded into the various tables as a result of crossing over from one zone to another zone. Large difference in radial placement of the tracks adjacent the boundary or overlap area such as overlap areas 620, 621, 622, 623 could cause significant track squeeze and track number inconsistencies. Large offsets in tangential (timing) positioning could result in low quality or completely incoherent servo signal. The servo channel could lose lock when the read head crosses a boundary or overlapping area 620, 621, 622, 623. The servo needs to function in a special, more error tolerant mode, during a seek, when the head is expected to pass over one of the overlap or boundary areas 620, 621, 622, 623 when passing between the first and the second zone or visa verse. It should also be noted that the firmware may disable certain functions that normally occur using the firm ware. For other functions, the trigger mechanisms may be relaxed when the transducer is in the vicinity of the boundary or overlap areas 620, 621, 622, 623. For example, if there is a large gap in the numbers of tracks at a boundary crossing, many disk drives have programs which detect shock events and shut down a disk drive or move the head 0, 1, 2, 3 to a park position in preparation of the shock event. This would need to be disabled so that when one of the heads or all of the heads are near the overlap or boundary areas 620, 621, 622, 623. Furthermore, another function that may be disabled when considering the tangential or timing and positioning of the servo is that of the spindle motor speed controller. In some disk drives when the distance between the servo address marks or servo wedges occurs in a short time, or in a time longer than a normal time, a motor controller may want to speed or slow down the spindle motor. Such functions will have to be disabled near the overlap areas or border areas 620, 621, 622, 623.

The more error tolerant mode or relaxed mode would have to be triggered by a calibration that could be run during self test during manufacture. It is contemplated that for each head 0, 1, 2, 3 a number of seeks could be done across there respective boundary or overlap area 620, 621, 622, 623 at each of the servo wedges on the disk. Discontinuities in the track number as well as discontinuities in the tangential (timing) placement of servo wedges between one side of the boundary and the other side of the boundary or overlapping area could then be recorded for each wedge associated with both the inner diameter and for each wedge associated with the outer diameter so that when a seek requires that the particular head flies or passes over the overlap or boundary areas 620, 621, 622, 623 a table can be referred too to determine that the disk continuity or the timing change is expected.

Figure 7:
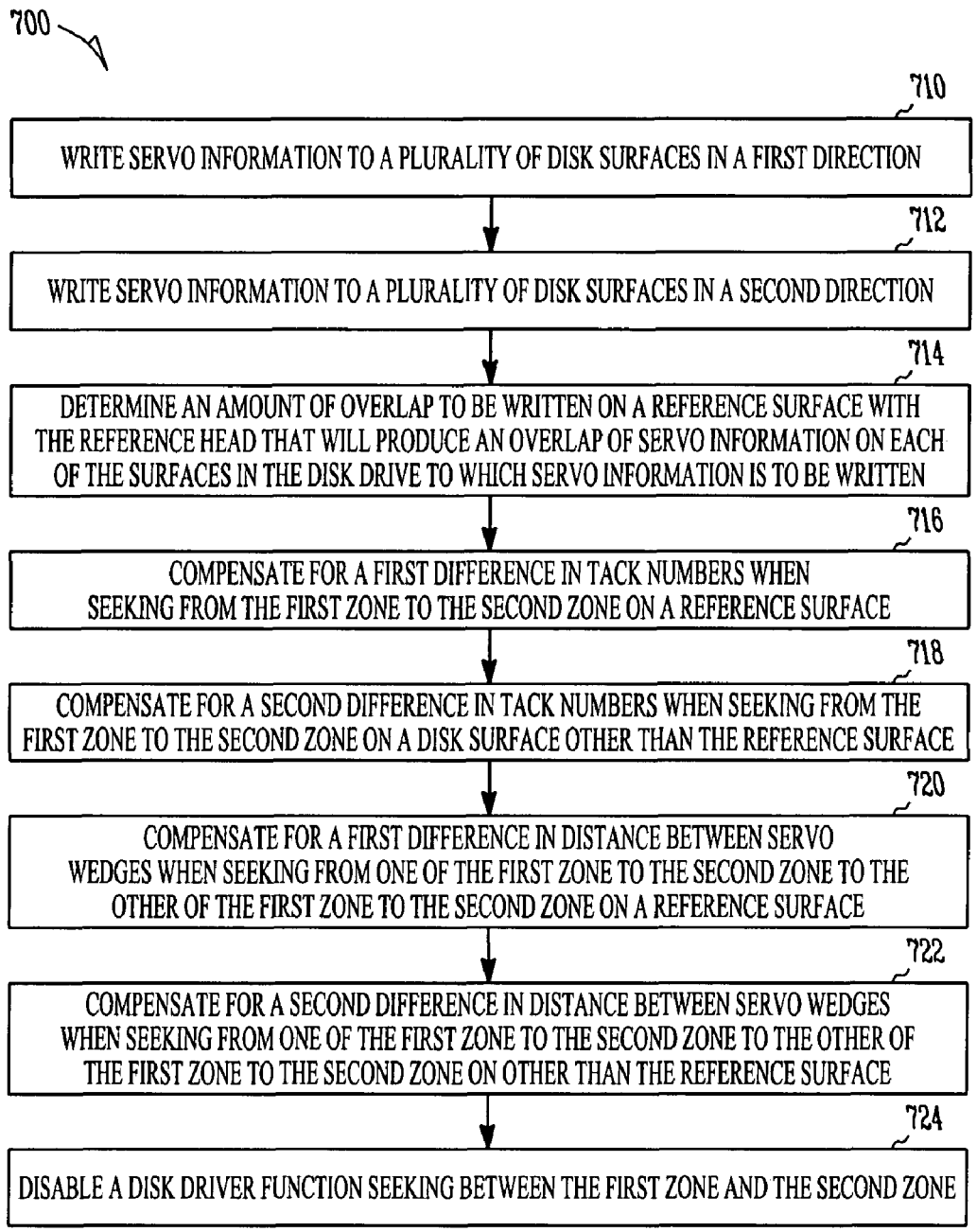
FIG. 7 is a flow chart of a method for determining a servo defects and placing the calibrated defect information into servo tables and using it during normal drive operation, according to an example embodiment.

FIG. 7 is a flow chart of a method 700 of self servo-writing servo information to a plurality of disk surfaces in a disk drive, according to an example embodiment. The method 700 of self servo-writing servo information to a plurality of disk surfaces in a disk drive includes writing servo information to a plurality of disk surfaces in a first direction 710, writing servo information to a plurality of disk surfaces in a second direction 712, and determining an amount of overlap to be written on a reference surface with the reference head that will produce an overlap of servo information on each of the surfaces in the disk drive to which servo information is to be written 714. Writing servo information to a plurality of disk surfaces in a first direction 710 includes one of writing servo information from an outer diameter of the disk to a middle overlap area. Writing servo information to a plurality of disk surfaces in a second direction 712 includes the other of writing servo information from an outer diameter of the disk to a middle overlap area. The middle overlap area of each of the disk surfaces differs by an amount related to the distance a particular disk surface in the disk drive is positioned with respect to the reference surface in the disk drive. The reference surface of the disk drive is the surface on which a reference head obtains servo positioning information used for feedback position control of the reference head (and indirectly the whole head stack) and writes the servo information.

The outer diameter to the middle diameter defines a first zone and the inner diameter to the middle diameter define a second zone. The method 700 also may include compensating for a first difference in track numbers when seeking from the first zone to the second zone on a reference surface 716, and compensating for a second difference in track numbers when seeking from the first zone to the second zone on a disk surface other than the reference surface 718. The method 700 may also include compensating for a first difference in distance between servo wedges when seeking from one of the first zone to the second zone to the other of the first zone to the second zone on a reference surface 720, and compensating for a second difference in distance between servo wedges when seeking from one of the first zone to the second zone to the other of the first zone to the second zone on other than the reference surface 722. What's important is not just a difference in placement of wedges relative to each other in each individual zone, but rather the difference in placement of each individual wedge in one zone relative to the matching wedge in the other zone.

In some embodiments, the method 700 includes disabling a disk drive function when seeking between the first zone and the second zone 724. The drive functions that are disabled may be any function. One example includes disabling the automatic shutdown of the drive when the read head detects a large change in the number of tracks which may be due to a shock event. Another example includes speeding up the spindle motor or slowing down the spindle motor in response to a change in the spacing of the servo wedges. Writing servo information can include writing servo information to a plurality of disk surfaces in a first direction substantially simultaneously at a first time. Similarly, servo information can be written to a plurality of disk surfaces in a second direction substantially simultaneously at a second time.

Figure 8:
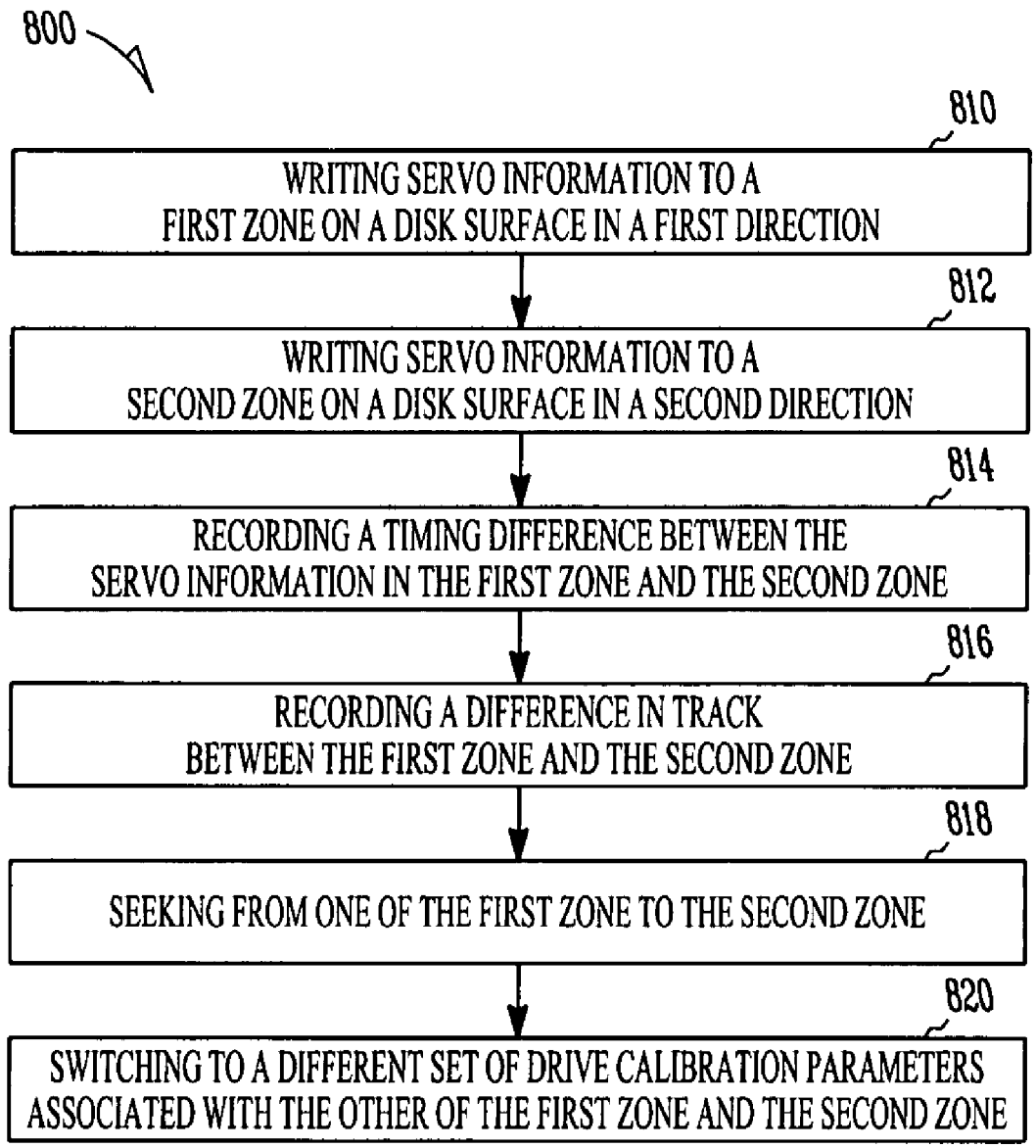
FIG. 8 is a representation of a defect list, according to an example embodiment.

FIG. 8 is a flow chart of a method 800 of self servo-writing servo information to a plurality of disk surfaces in a disk drive, according to an example embodiment. The method 800 of self servo-writing servo information to a plurality of disk surfaces in a disk drive includes writing servo information to a first zone on a disk surface in a first direction 810, writing servo information to a second zone of the disk surfaces in a second direction 812, and recording a timing difference between the servo information in the first zone and the second zone 814. The method 800 also includes recording a difference in track numbers between the first zone and the second zone 816. The method 800, in some embodiments, includes seeking from one of the first zone to the second zone 818, and switching to a different set of drive calibration parameters associated with the other of the first zone and the second zone 820. The recording of the timing difference and the difference in track number is done for selected servo wedges during a self testing mode.

A disk drive 100 includes a disk stack 500 including a disk, such as disk 510 for storing information representing data, The disk 510 further includes a first disk surface 530 for recording information, and a second disk surface 532 for recording information. The first disk surface 530 includes a first servo pattern written in a first direction, a second servo pattern written in a second direction, and a first overlap 620 area between the first servo pattern and the second servo pattern. The first overlap area 620 has a first width. The second disk surface 531 for recording information includes a third servo pattern written in a first direction, a fourth servo pattern written in a second direction, and a second overlap area 621 between the third servo pattern and the fourth servo pattern. The second overlap area 621 has a second width which differs from the first width 620. In one embodiment, the disk stack 500 has a plurality of disks. The first disk surface 530 and the second disk surface 531 include a plurality of concentric tracks. The first overlap area 620 is located between the inner diameter and the outer diameter of the first disk surface 530. The second overlap area 621 is located between the inner diameter and the outer diameter of the second disk surface 531. The disk drive also includes a microprocessing unit 430. The microprocessing unit 430 includes a seek algorithm that detects the first overlap area 620 or the second overlap area 621. The microprocessing unit 430 also can include a seek algorithm that compensates for timing differences, or compensates for a gap in the data tracks during a seek passing over one of the first overlap area 620 or the second overlap area 621. The microprocessing unit 430 may also disable a disk drive function or relax the conditions necessary to trigger a disk drive function during a seek over one of the first overlap area 620 or the second overlap area 621. The drive may contain number of heads different than four A disk 510 includes a first disk surface 530 and a second disk surface 531 for recording information. The first disk surface 530 includes a first servo pattern written in a first direction, a second servo pattern written in a second direction, and a first overlap area 620 between the first servo pattern and the second servo pattern. The first overlap area 620 has a first width. The second disk surface 531 for recording information includes a third servo pattern written in a first direction, a fourth servo pattern written in a second direction, and a second overlap area 621 between the third servo pattern and the fourth servo pattern. The second overlap area 621 has a second width which differs from the first width. In one embodiment of the disk, the first overlap area 620 and the second overlap area 621 are substantially devoid of data tracks.

Figure 9:
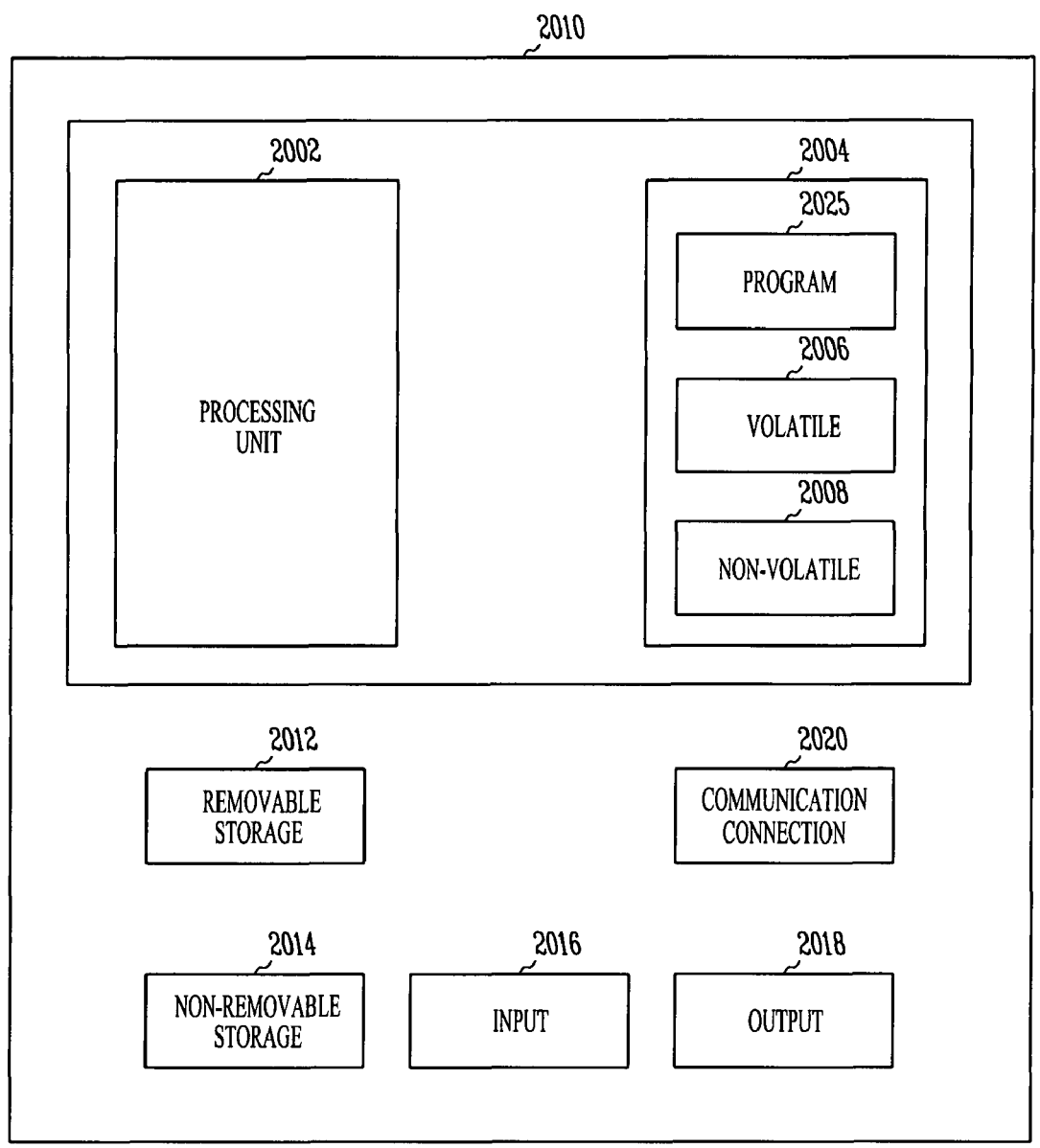
FIG. 9 is an example block diagram of a computer system for implementing functions and controllers described in accordance with example embodiments.

A block diagram of a computer system that executes programming for performing the above algorithm is shown in FIG. 9. A general computing device in the form of a computer 2010, may include a processing unit 2002, memory 2004, removable storage 2012, and non-removable storage 2014. Memory 2004 may include volatile memory 2006 and non volatile memory 2008. Computer 2010 may include or have access to a computing environment that includes a variety of computer-readable media, such as volatile memory 2006 and non-volatile memory 2008, removable storage 2012 and non-removable storage 2014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 2010 may include or have access to a computing environment that includes input 2016, output 2018, and a communication connection 2020. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. The microprocessor 210 or other selected circuitry or components of the disk drive may be such a computer system.

Computer-readable instructions stored on a computer-readable medium are executable by the processing unit 2002 of the computer 2010. A hard drive, CD-ROM, and RAM are some examples of articles including a computer-readable medium. The machine-readable medium provides instructions that, when executed by a machine, cause the machine to perform operations that include locating a first data sector on a disk where a write operation fails, identifying the first data sector and a plurality of other data sectors near the first data sector as a grown defect, and storing the location of the first data sector and the plurality of other data sectors on a grown defect list. In one embodiment, the operation of identifying the plurality of other data sectors further includes identifying data sectors located in the same track on the disk as the first data sector. The machine readable medium may also execute instructions which cause the operation of identifying the plurality of other data sectors that is related to the number of data sectors located between a first servo wedge and a second servo wedge on the disk. In one embodiment, the first data sector located between the first servo wedge and the second servo wedge.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of writing servo information to a plurality of disk surfaces in a disk drive comprising:
    writing servo information to a plurality of disk surfaces in a first direction;
    writing servo information to a plurality of disk surfaces in a second direction; and
    determining an amount of overlap to be written on a reference surface with a reference head that will produce an overlap of servo information on each of the surfaces in the disk drive to which servo information is to be written.

2. The method of claim 1, wherein writing servo information to a plurality of disk surfaces in a first direction includes one of writing servo information from an outer diameter of the disk to a middle overlap area, and from an inner diameter of the disk to the middle overlap area.

3. The method of claim 2, wherein writing servo information to a plurality of disk surfaces in a second direction includes the other of writing servo information from an outer diameter of the disk to a middle overlap area, and from an inner diameter of the disk to the middle overlap area.

4. The method of claim 3, wherein the middle overlap area differs by an amount related to the distance for which a particular disk surface in the disk drive is positioned with respect to a reference surface in the disk drive.

5. The method of claim 1, wherein the outer diameter to the middle diameter defines a first zone and the inner diameter to the middle diameter define a second zone.

6. The method of claim 5, further comprising:
compensating for a first difference in track numbers when seeking from the first zone to the second zone on a reference surface; and
compensating for a second difference in track numbers when seeking from the first zone to the second zone on a disk surface other than the reference surface.

7. The method of claim 5, further comprising:
compensating for a first difference in distance between servo wedges when seeking from one of the first zone and the second zone to the other of the first zone and the second zone on a reference surface; and
compensating for a second difference in distance between servo wedges when seeking from one of the first zone and the second zone to the other of the first zone and the second zone on other than the reference surface.

8. The method of claim 1, wherein writing servo information to a plurality of disk surfaces in a first direction is done substantially simultaneously at a first time.

9. The method of claim 8, wherein writing servo information to a plurality of disk surfaces in a second direction is done substantially simultaneously at a second time.

* * * * *